(12) United States Patent
Takashima et al.

(10) Patent No.: US 7,116,562 B2
(45) Date of Patent: Oct. 3, 2006

(54) SYNCHRONOUS RECTIFICATION SWITCHING POWER SUPPLY

(75) Inventors: Makoto Takashima, Toyama (JP); Yoshimichi Hirokawa, Toyama (JP)

(73) Assignee: Cosel Co., Ltd., Toyama (JP)

( * ) Notice: Subject to any disclaimer, the term of this patent is extended or adjusted under 35 U.S.C. 154(b) by 0 days.

(21) Appl. No.: 10/518,137

(22) PCT Filed: Nov. 18, 2003

(86) PCT No.: PCT/JP03/14689

§ 371 (c)(1),
(2), (4) Date: Dec. 15, 2004

(87) PCT Pub. No.: WO2004/047278

PCT Pub. Date: Jun. 3, 2004

(65) Prior Publication Data

US 2005/0207188 A1    Sep. 22, 2005

(30) Foreign Application Priority Data

Nov. 19, 2002  (JP) ............................. 2002-335236
Apr. 18, 2003  (JP) ............................. 2003-113618

(51) Int. Cl.
*H02M 3/335*    (2006.01)

(52) U.S. Cl. ................... 363/21.06; 363/21.14; 363/20; 323/222; 323/284

(58) Field of Classification Search .......... 363/16–20, 363/97, 21.6, 21.12, 95, 131, 21.14; 323/222, 323/284, 275, 277
See application file for complete search history.

(56) References Cited

U.S. PATENT DOCUMENTS 5,726,869 A * 3/1998 Yamashita et al. ...... 363/21.06
5,861,734 A * 1/1999 Fasullo et al. ........... 323/222
6,430,063 B1 * 8/2002 Nishimura et al. ...... 363/21.06
6,490,179 B1 * 12/2002 Boylan et al. .......... 363/21.06
6,661,279 B1 * 12/2003 Yabe ....................... 327/546
6,803,750 B1 * 10/2004 Zhang ..................... 323/222

FOREIGN PATENT DOCUMENTS

| JP | 5-199744 A    | 8/1993  |
| JP | 6-319257 A    | 11/1994 |
| JP | 2000-116122 A | 4/2000  |
| JP | 2001-292569 A | 10/2001 |
| JP | 2002-084755 A | 3/2002  |
| JP | 2002-199713 A | 7/2002  |

* cited by examiner

*Primary Examiner*—Rajnikant B. Patel
(74) *Attorney, Agent, or Firm*—Frishauf, Holtz, Goodman & Chick, P.C.

(57) ABSTRACT

A fly-back type synchronous rectifying switching power supply device in which a rectifying element is turned off before the main switch is turned on even when the on-time of a main switch element is lengthened due to sudden variation of a load. The synchronous rectifying switching power supply device is equipped with a synchronous rectifying element connected to a secondary winding of a transformer in series and driving means including an auxiliary winding for turning on the synchronous rectifying element complementarily with a main switch element between output terminals. A transistor serving as interrupting means for turning off the synchronous rectifying element is provided between the gate and source of the synchronous rectifying element. An off-timing at which the synchronous rectifying element is turned off by the interrupting means is set within a timing range which corresponds to a fixed time after the main switch element is turned on and also is as near as a fixed driving period of the main switch element.

8 Claims, 5 Drawing Sheets

SYNCHRONOUS RECTIFICATION SWITCHING POWER SUPPLY

This application is a U.S. National Phase Application under 35 USC 371 of International Application PCT/JP2003/014689 filed Nov. 18, 2003.

TECHNICAL FIELD

The present invention relates to a synchronous rectifying type switching power supply device for converting a DC voltage to a desired voltage and supplying the voltage to electronic equipment, and particularly to a fly-back type synchronous rectifying switching power supply device.

BACKGROUND ART

In a conventional fly-back converter which is a switching power supply device having a synchronous rectification type rectifying circuit, a series circuit comprising a DC power source and a main switching element is connected to a primary winding side of a transformer, and a synchronous rectifying element is provided to a secondary winding of the transformer in series, and further connected to an output terminal through a rectifying circuit as disclosed in JP-A-2000-116122. The fly-back converter controls to turn on/off the main switch element of a MOS-FET. When the main switch element is turned off, the MOS-FET which is a synchronous rectifying element of the secondary side circuit of the transformer is turned on, and an output capacitor of the rectifying circuit is charged by a fly-back voltage occurring at the secondary winding. Thereafter, the synchronous rectifying element is turned off before the main switch element is turned on, and this operation is repeated to supply power to the output side.

In the case of the synchronous rectifying type fly-back converter as described above, when the off-timing of the synchronous rectifying element is missed and thus the main switch is turned on under the state that the synchronous rectifying element is still turned on, the circuit at the secondary side of the power supply device falls into a short-circuited state, and thus a large surge current flows into the main switch element, so that the main switch element, the synchronous rectifying element, etc. may be broken.

Therefore, as disclosed in JP-A-2000-116122, there is known a switching power supply circuit in which in order to prevent the simultaneous on-state of the main switch element and the synchronous rectifying element, in response to turn-off the main switch element, a timing capacitor is charged with current determined by a voltage induced at an auxiliary winding and a timing resistor after the synchronous rectifying element is turned on, and an auxiliary transistor is turned on after a fixed time to turn off the rectifying element.

Figure 1:
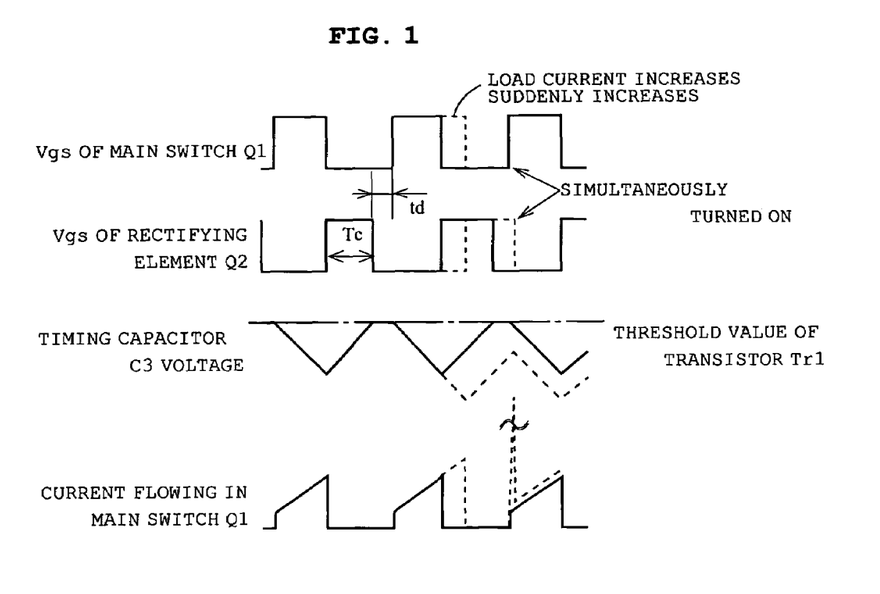
FIG. 1 is a timing chart showing the operation of a conventional fly-back type synchronous rectifying switching power supply device.

In the case of the synchronous rectifying type switching power supply device of the prior art described above, the fixed time Tc of the timing capacitor is set to be prior to the on-timing of the main switch element to some degree by providing a dead time td so that the rectifying element is necessarily turned off before the main switch element is turned on as shown in FIG. 1. The dead time td is set by the time constant of the timing capacitor so that the rectifying element is turned off within an off-time of the main switch element which is determined by an input voltage, an output voltage and a turn ratio of the transformer.

However, in the case of the conventional synchronous rectifying type fly-back converter, there is a case where load current increases rapidly and the main switch element is turned on for a time longer than the on-time of the main switch element determined by the input/output voltage and the turn ratio of the transformer. In such a case, there is a case where the voltage of the timing capacitor does not reach the threshold voltage of the auxiliary transistor element for turning off the synchronous rectifying element within a fixed on/off period of the main switch element as indicated by a broken line of FIG. 1. In such a case, there is a problem that the main switch element is turned on before the rectifying element is turned off, and a very large surge current flows into the main switch element, so that the circuit at the secondary side of the power supply device is kept short-circuited and thus through current flows into the secondary side circuit, resulting in breaking of the main switch element, the synchronous rectifying element, etc.

During the period of the dead time td, the rectifying operation is carried out by a diode connected to the synchronous rectifying element in parallel or a body diode of MOS-FET serving as the synchronous rectifying element. The loss during the rectifying period of the diode is larger than that during the period when the rectifying element of the MOS-FET is turned on. Accordingly, the dead time is required to be as short as possible, however, there is a problem that it is impossible to shorten the dead time td in order to surely turn off the synchronous rectifying element before the main switch element is turned on. Furthermore, the switching frequency cannot be increased because the dead time td cannot be shortened, which also prevents miniaturization and lower cost to produce the device.

In addition, there is also a problem that when a voltage not less than a set voltage is applied between the output voltage terminals from the external or when power supply is stopped in a case where a large-capacity external capacitor is provided between the output terminals, the synchronous rectifying element at the secondary side cannot be turned off and thus through current flows, or self-excitation oscillation occurs in the secondary side circuit by the power of the large-capacity external capacitor connected between the output terminals.

The invention has an object to provide a fly-back type synchronous rectifying switching power supply device which can surely turn off a synchronous rectifying element before a main switch is turned on even when the on-time of the main switch element is lengthened due to sudden variation of a load.

Furthermore, the invention has an object to provide a fly-back type synchronous rectifying switching power supply device which can prevent through current of a switching power supply circuit and self-excitation oscillation irrespective of sudden variation of a load or external equipment connected between the output terminals.

DISCLOSURE OF THE INVENTION

A fly-back type synchronous rectifying switching power supply device having a primary winding of a transformer and a main switch element are connected to each other in series between input terminals and which has a control circuit for subjecting the main switch element to PWM control within a fixed period, a synchronous rectifying element connected to a secondary winding of the transformer in series between output terminals, and driving means for turning on the synchronous rectifying element complementarily with the switching element, is equipped with a different power supply source charged by a pulse voltage occurring at the secondary winding of the transformer through a switching operation of the main switch element, and interrupting means which is disposed between the gate and source of the synchronous rectifying element and turns off the synchronous rectifying element, wherein an off-timing at which the interrupting means turns off the synchronous rectifying element is set to a timing which corresponds to a fixed time set by current from the different power source after the switch element is turned on and is within a range which is as near as a fixed driving period of the switch element.

The interrupting means includes a transistor and a timing capacitor connected to a signal input terminal of the transistor, the timing capacitor is charged by the different power source and discharged at the instantaneous time when the main transistor is turned on, the timing capacitor is started to be charged from the instantaneous time concerned, and a period from this time to time in which the voltage of the timing capacitor exceeds a threshold value of the signal input terminal of the transistor is set to a time within the fixed driving period of the switch element.

The different power source is a constant voltage source or constant current source connected to the secondary winding of the transformer. A snubber circuit for absorbing surge energy when the synchronous rectifying element is turned off may be also used as the different power source for charging the timing capacitor so that the timing capacitor is charged with the energy absorbed by the snubber circuit.

According to the synchronous rectifying switching power source of the invention, the synchronous rectifying element is surely turned off within a fixed period from the on-timing of the main switch element, so that the main switch element and the synchronous rectifying element can be prevented from simultaneously falling into an on-state even when load current varies suddenly. Accordingly, the dead time from the turn-off time of the synchronous rectifying element until the on-timing of the main switch can be shortened as much as possible, the rectifying period based on the diode is reduced to suppress the loss, and the switching frequency can be increased. Furthermore, the invention contributes to miniaturization and reduction in cost.

Furthermore, a fly-back type synchronous rectifying switching power supply device includes a primary winding of a transformer and a main switch element are connected to each other in series between input terminals and which has a control circuit for subjecting the main switch element to PWM control within a fixed period, a synchronous rectifying element connected to a secondary winding of the transformer in series between output terminals, and driving means for turning on the synchronous rectifying element complementarily with the switching element, is equipped with a different power supply source charged by a pulse voltage occurring at the secondary side winding of the transformer through a switching operation of the main switch element, interrupting means which is disposed between the gate and source of the synchronous rectifying element and turns off the synchronous rectifying element, and a control element for comparing the output voltage of the different power source with the output voltage of the output terminal of the switching power supply device, and controlling the interrupting means to turn off the synchronous rectifying element when the output voltage of the different power source is reduced to a fixed value or less.

A transistor of the interrupting means is an npn transistor for turning off the synchronous rectifying element, and the control element includes a pnp transistor whose emitter and collector are connected to the output terminal and the base of the npn transistor respectively, and the output of the different power source is connected to the base of the pnp transistor. The output voltage of the different power source may be divided and input a divided voltage to the base of the pnp transistor.

According to the other invention of this application, through current due to sudden variation of a load and a self-excitation oscillation phenomenon occurring when the power source is stopped or an external voltage is applied can be surely prevented, the miniaturization of the constituent parts of the device can be performed and the miniaturization of the whole device and the reduction in cost can be enabled.

BEST MODES FOR CARRYING OUT THE INVENTION

Figure 2:
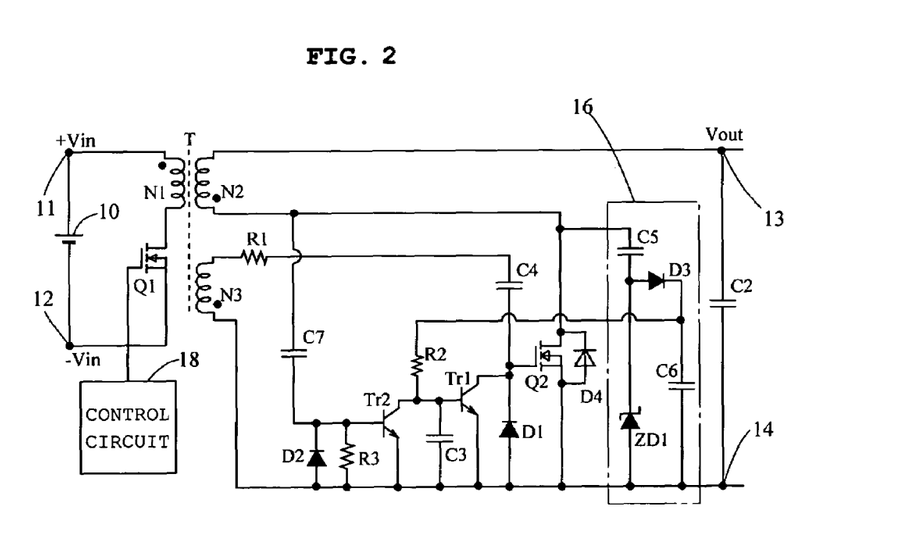
FIG. 2 is a schematic circuit diagram showing a synchronous rectifying switching power supply device according to an embodiment of the invention.

Embodiments of the invention will be described with reference to the drawings. FIG. 2 is a circuit showing a fly-back type synchronous rectifying switching power device according to a first embodiment of the invention. In the switching power supply circuit, a DC power source 10 is connected between input terminals 11 and 12, and a main switch element Q1 of MOS-FET is connected to the primary winding N1 of the transformer T in series. The input terminal 11 at the plus side of the DC power source 10 is connected to one dot-affixed side terminal of the primary winding N1 which is a terminal at which a positive voltage occurs when the main switching element Q1 is turned on, and the other non-dot-affixed side terminal of the transformer T is connected to the drain of the main switch element Q1. The source of the main switch element Q1 is connected to the input terminal 12 at the minus side of the DC power source 10, and the gate of the main switch element Q1 is connected to a driving signal output of a control circuit 18 for subjecting the main switch element Q1 to PWM (Pulse width Modulation) control in accordance with an input/output condition at a fixed period.

A non-dot-affixed side terminal of the secondary winding N2 of the transformer T is connected to one end of an output capacitor C2, and the other dot-affixed side terminal of the secondary winding N2 of the transformer T is connected to the drain of the synchronous rectifying element Q2 of MOS-FET. The source of the synchronous rectifying element Q2 is connected to a reference potential side corresponding to the other end side of the output capacitor C2. Both the ends of the output capacitor C2 are connected to the output terminals 13 and 14. A diode D4 is connected between the drain and source of the synchronous rectifying element Q2 in parallel. The anode and cathode of the diode D4 are connected to the source and drain of the synchronous rectifying element Q2, respectively. Accordingly, the diode D4 may be replaced by a body diode of the synchronous rectifying element Q2 of MOS-FET.

Furthermore, an auxiliary winding N3 is provided as driving means of the synchronous rectifying element Q2 at the secondary side of the transformer T, a dot-affixed side terminal of the auxiliary winding N3 is connected to reference potential, and a non-dot-affixed side terminal is connected to one end of an operation accelerating capacitor C4 through a resistor R1. The other end of the capacitor C4 is connected to the cathode of the diode D1, and the anode of the diode D1 is connected to the reference potential. The gate of the synchronous rectifying element Q2 is connected between the cathode of the diode D1 and the other end of the capacitor C4.

The collector of an npn type transistor Tr1 is connected to the gate of the synchronous rectifying element Q2, and the emitter of the transistor Tr1 is connected to the reference potential. One end of a timing capacitor C3 is connected to the base serving as a signal input signal terminal of the transistor Tr1, and the other end of the timing capacitor C3 is connected to the reference potential. The output of a constant voltage source 16 which is a different power source is connected to the base of the transistor Tr1 through a resistor R2, and also connected to the collector of an npn type transistor Tr2. The emitter of the transistor Tr2 is connected to the reference potential, and the base thereof is connected to the dot-affixed side terminal of the secondary winding N2 through a capacitor C7. A resistor R3 and a diode D2 are connected in parallel between the base and emitter of the transistor Tr2. The cathode and anode of the diode D2 are connected to the base and the reference potential, respectively.

The constant voltage source 16 comprises a capacitor C5 whose one end is connected to a dot-affixed side terminal of the secondary winding N2, a diode D3 whose anode is connected to the other end of the capacitor C5, a capacitor C6 connected between the cathode of the diode D3 and the reference potential, and a zener diode ZD1 connected between the anode of the diode D3 and the reference potential. The cathode of the zener diode ZD1 is connected to the anode of the diode D3, and the anode thereof is connected to the reference potential. The constant voltage source 16 also serves as a snubber circuit for absorbing surge energy when the synchronous rectifying element Q2 is turned off.

Figure 3:
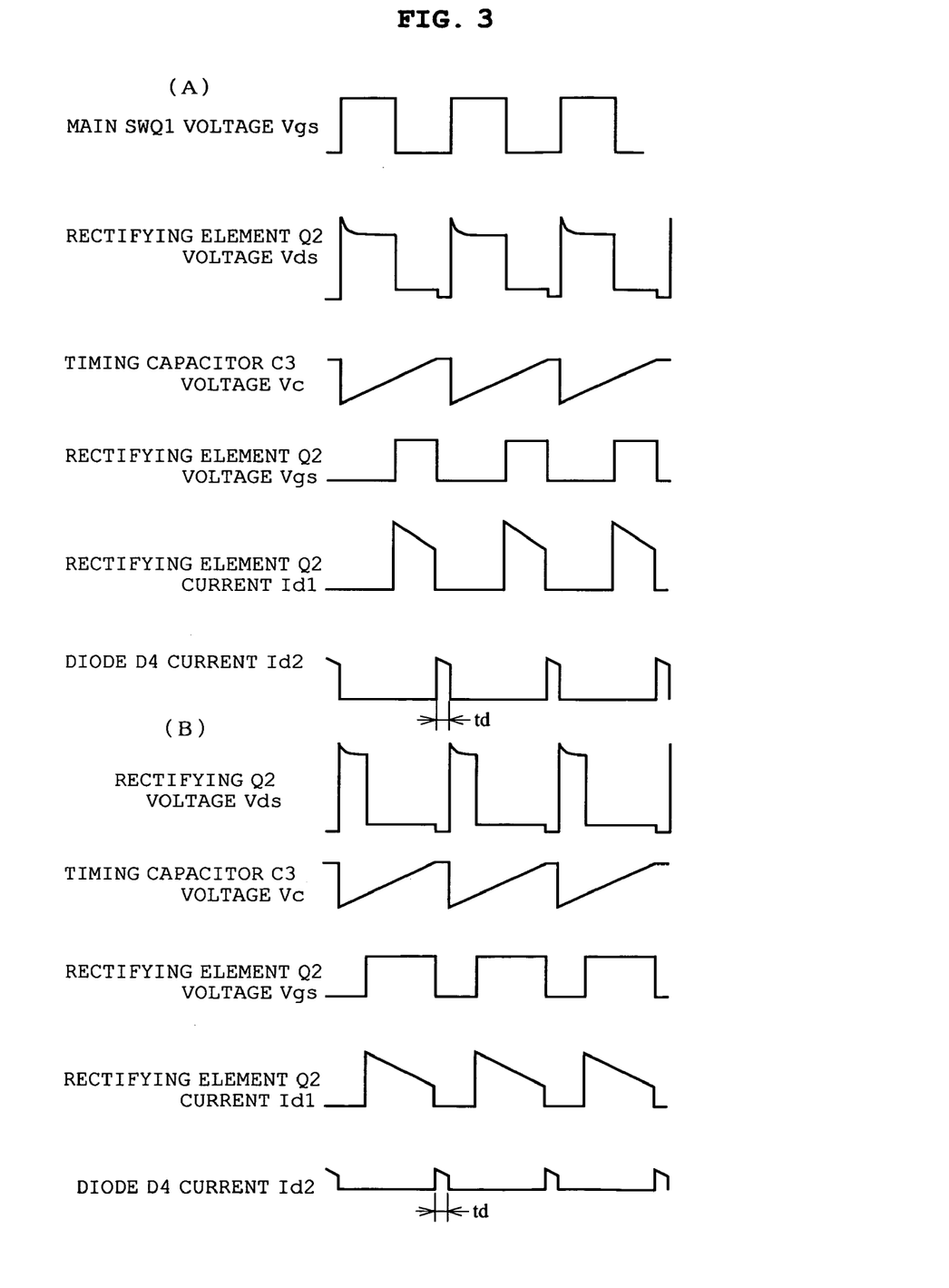
FIG. 3 is a timing chart (A) showing the operation when a duty ratio of the main switch element of the synchronous rectifying switching power supply device of this embodiment is broad, and a timing chart (B) showing the operation when the duty ratio is narrow.

Next, the control method and operation of the synchronous rectifying switching power supply of this embodiment will be described with reference to FIGS. 2 and 3. First, when the main switch element Q1 is turned on in the circuit of FIG. 2, each of the dot-affixed sides of the primary winding N1 and the secondary winding N2 is set to plus. However, as shown in FIGS. 3(A), (B), the potential Vgs between the gate and source of the synchronous rectifying element Q2 is low, and the synchronous rectifying element Q2 is turned off, so that no current Id1 flows in the synchronous rectifying element Q2. Furthermore, at this time, current flows from the dot-affixed side of the secondary winding N2 into the constant voltage source 16 to charge the capacitors C5 and C6, and a constant voltage set by the zener diode ZD1 is achieved at one end of the capacitor C6 of the constant voltage source 16. Current flows from one end of the capacitor C6 corresponding to the output of the constant voltage source 16 through the resistor R2 into the timing capacitor C3 to charge the timing capacitor C3. Furthermore, during the period when the main switch element Q1 is turned on, the dot-affixed side of the auxiliary winding N3 is high, however, the gate of the synchronous rectifying element Q2 is set to the reference potential through the diode D1.

Thereafter, when the main switch element Q1 is turned off on the basis of the PWM control in conformity with an input/output condition by the control circuit 18, a fly-back voltage occurs at the non-dot-affixed side of the secondary winding N2, and also a fly-back voltage simultaneously occurs at the non-dot-affixed side of the auxiliary winding N3, so that the gate capacitor Ciss of the synchronous rectifying element Q2 is charged through the capacitor C4 and the potential Vgs between the gate and the source is made high, thereby turning on the synchronous rectifying element Q2. Accordingly, the current Id1 flows from the non-dot-affixed side terminal of the secondary winding through the output capacitor C2 to the dot-affixed side terminal to charge the output capacitor C2.

Furthermore, the timing capacitor C3 is charged with current from the constant voltage source 16 immediately after the main switch element Q1 is turned on, and when a fixed time elapses, the potential of the timing capacitor C3 reaches the threshold value of the base of the transistor Tr1. Accordingly, the transistor Tr1 is turned on, the gate capacitor Ciss of the synchronous rectifying element Q2 is discharged, and the synchronous rectifying element Q2 is turned off. However, even after that, current Id2 is made to flow by the diode D4 equipped in parallel to the synchronous rectifying element Q2 until the main switch element Q1 is turned on. The current Id2 is smaller than the current Id1 because the diode imposes some loss. The period during which current is made to flow by the diode D4 corresponds to the dead time dt for turning off the synchronous rectifying element Q2 before the main switch element Q1 is turned on.

When the main switch Q1 is turned on, the potential of the dot-affixed side of the secondary winding N2 is applied to the base of the transistor Tr1 through the capacitor C7, and at that instantaneous time the transistor Tr1 is made low, and the charges of the timing capacitor C3 are instantaneously discharged. This period is completed in a sufficiently shorter instantaneous time as compared with the switching frequency of the main switch element Q1 because the capacitance of the capacitor C7 is relatively sufficiently small. From this instantaneous time, the charging of the timing capacitor C3 is started again as described above.

In the fly-back type synchronous rectifying switching power supply device of this embodiment, the switching frequency T of the main switch element Q1 is fixed by the control circuit 18, and Duty corresponding to the on-period of the main switch element Q1 is varied in conformity with the input/output condition as shown in FIGS. 3(A), (B). However, the potential of the timing capacitor C3 applied to the base of the transistor Tr1 reaches the threshold value of the base of the transistor Tr1 in a fixed time from the on-timing of the main switch element Q1 by the constant voltage source 16. Therefore, since the output voltage is increased when the load current rapidly increases and the output voltage is transitionally lowered, the synchronous rectifying element Q2 is surely turned off in a fixed time from the on-timing of the main switch element Q1 even when the on-period of the main switch element Q is temporarily long. Accordingly, the dead time td from the turn-off of the synchronous rectifying element Q2 until the turn-on of the main switch element Q1 can be set to be as short as possible, the rectifying period by the diode D4 is shortened to suppress the loss, and the switching frequency can be increased.

Furthermore, the constant voltage source 16 serving as the charging circuit for the timing capacitor C3 constitutes the snubber circuit for absorbing the surge energy when the synchronous rectifying element Q2 is turned off, and the timing capacitor is charged with the energy absorbed by the snubber circuit. Therefore, the constant voltage source 16 can serve as a power source having a high energy efficiency.

Figure 4:
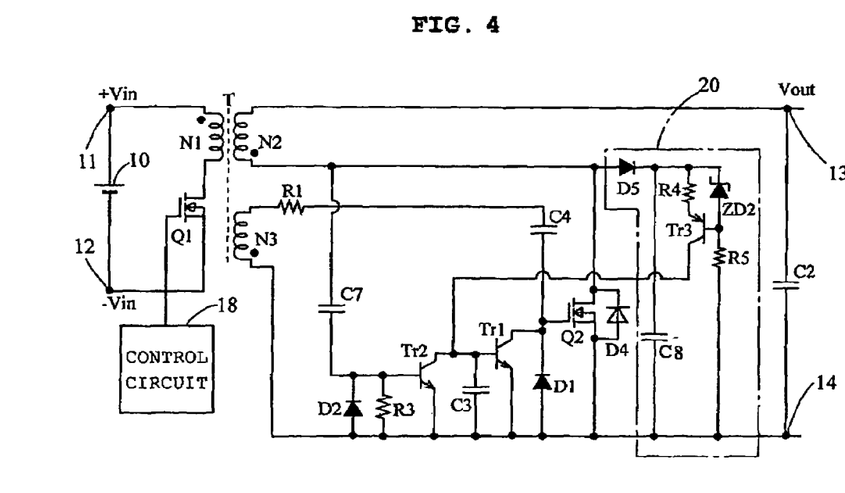
FIG. 4 is a schematic circuit diagram showing a synchronous rectifying switching power supply device according to a second embodiment of the invention.

Next, a synchronous rectifying switching power supply device of a second embodiment of the invention is shown in FIG. 4. Here, the same constituent elements as the above embodiment are represented by the same reference numerals, and the description thereof is omitted. This embodiment is different from the first embodiment in that the output of a constant current source 20 comprising a constant current circuit is connected to the timing capacitor C3.

The constant current source 20 is equipped with a diode D5 whose anode is connected to a dot-affixed side terminal of the secondary winding N2 of the transformer T, and a capacitor C8 having one end connected to the cathode of the diode D5 and the other end connected to the reference potential. Furthermore, the cathode of the diode D5 is connected to the emitter of an pnp type transistor Tr3 through a resistor R4, and the collector of the transistor Tr3 is connected to one end of the timing capacitor C3 as an output of the constant current source 20. Furthermore, the cathode of a zener diode ZD2 is connected to the cathode of the diode D5, and the anode of the zener diode ZD2 is connected to the base of the transistor Tr3 and also connected to the reference potential through a resistor R5. The constant current is set by the resistor R4 and the constant voltage set by the zener diode ZD2.

In the fly-back type synchronous rectifying switching power supply device of this embodiment, the timing capacitor C3 can be charged with constant current from the constant current circuit 20, and the voltage of the timing capacitor C3 is linearly increased.

The synchronous rectifying switching power supply device of this embodiment can also achieve the same effect as the above embodiment. In this case, particularly the voltage of the timing capacitor C3 linearly rises up, and it is easy to set the off-timing of the synchronous rectifying element Q2. A snubber circuit may be equipped with the constant current source 20. Accordingly, the energy efficiency can be further enhanced.

Figure 5:
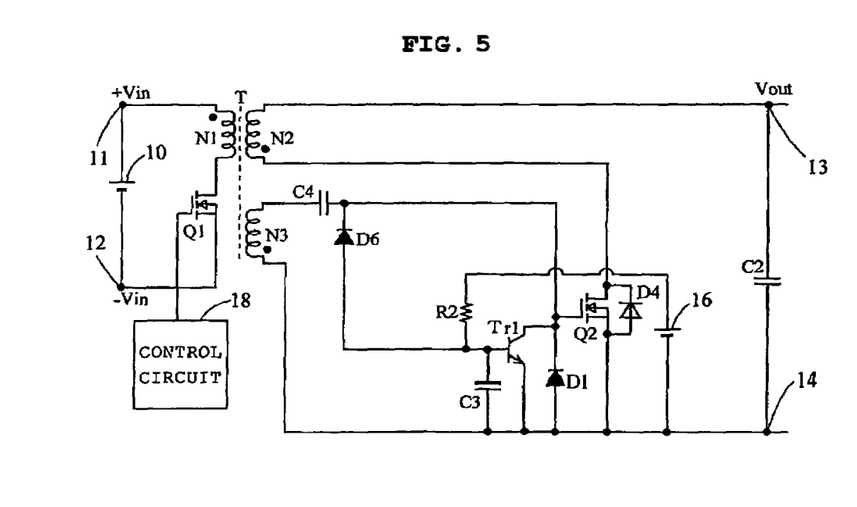
FIG. 5 is a schematic circuit diagram showing a synchronous rectifying switching power supply device according to a third embodiment of the invention.

Next, a synchronous rectifying switching power supply device of a third embodiment of the invention is shown in FIG. 5. Here, the same constituent elements as the above embodiment are represented by the same reference numerals, and the description thereof is omitted. This embodiment is different from the first embodiment in that one end of the timing capacitor C3 is connected between an operation accelerating capacitor C4 and the terminal connected to the collector of the transistor Tr1 through a diode D6. The anode of the diode D6 is connected to the timing capacitor C3 and the cathode thereof is connected to the terminal of the capacitor C4.

The operation of the synchronous rectifying switching power supply device of this embodiment is the same as the circuit of the above embodiment, however, the discharge of the timing capacitor C3 is carried out when the main switch element Q1 is turned off and the dot-affixed side of the auxiliary winding N3 is set to plus potential. At this time, current flows from the dot-affixed side terminal of the auxiliary winding N3 through the electrode of the capacitor C3 at the reference potential side and the electrode thereof at the opposite side, the diode D6 and the capacitor C4 to the non-dot affixed side terminal of the auxiliary winding N3, thereby discharging the capacitor C3.

This embodiment can also achieve the same effect as the first embodiment. Furthermore, the circuit construction for discharging the timing capacitor C3 can be simplified, and the number of parts is reduced to promote miniaturization of the device and reduction of the cost.

Figure 6:
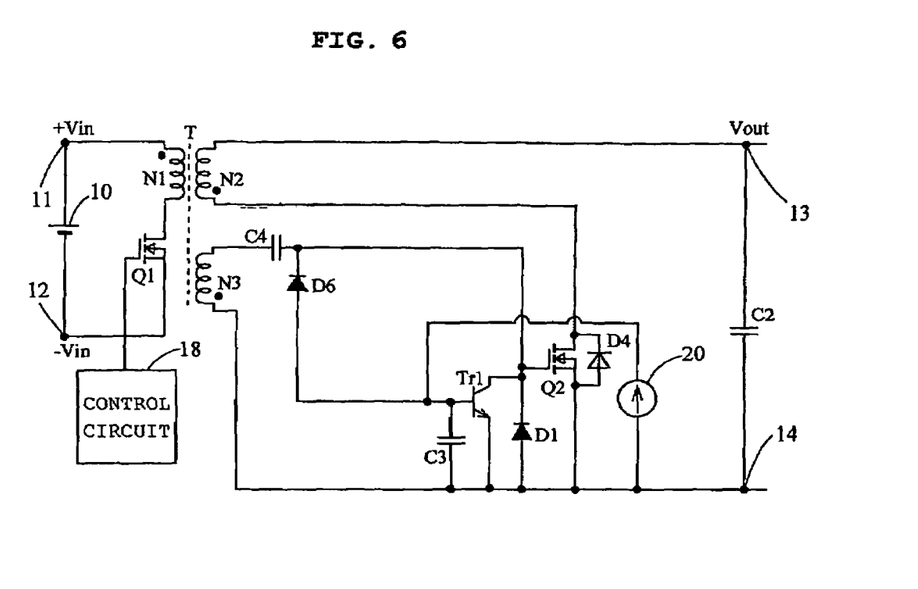
FIG. 6 is a schematic circuit diagram showing a synchronous rectifying switching power supply device according to a fourth embodiment of the invention.

Next, a synchronous rectifying switching power supply device according to a fourth embodiment of the invention is shown in FIG. 6. Here, the constituent elements as the above embodiment are represented by the same reference numerals, and the description thereof is omitted. In this embodiment, the constant voltage source 16 of the third embodiment is replaced by the constant current source 20. According to this embodiment, the same effect as the second embodiment can be achieved, and further the circuit construction for discharging the timing capacitor C3 can be simplified as in the case of the third embodiment. Therefore, the miniaturization of the device and the reduction in cost can be promoted.

Figure 7:
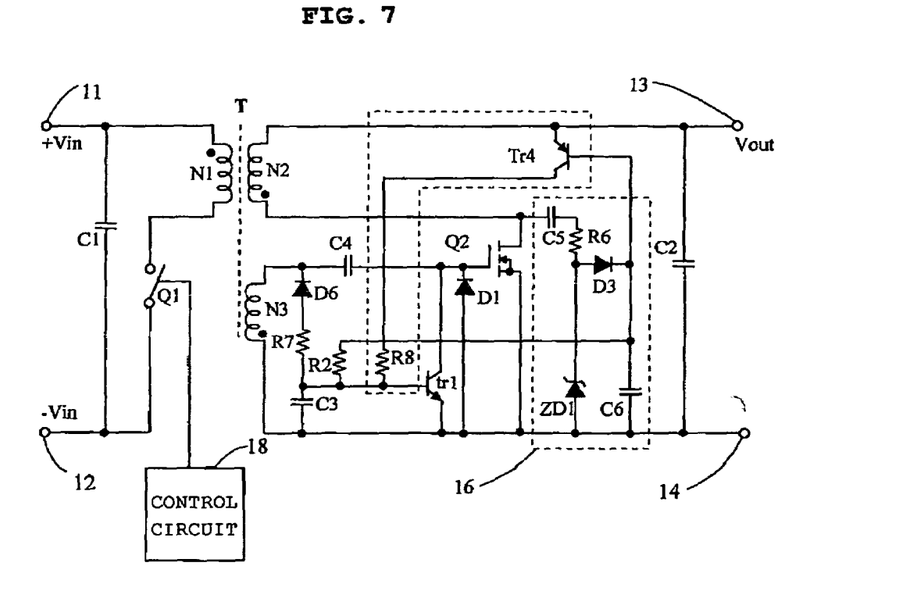
FIG. 7 is a schematic circuit diagram showing a synchronous rectifying switching power supply device according to a fifth embodiment of the invention.

Next, a synchronous rectifying switching supply device of a fifth embodiment is shown in FIG. 7. Here, the same constituent elements as the above embodiment are represented by the same reference numerals, and the description thereof is omitted. In the synchronous rectifying switching power supply device of this embodiment, an input capacitor C1 is equipped in parallel to the input terminals 11, 12 of the DC power source, and a series circuit comprising the primary winding N1 of the transformer T and the main switch element Q1 is connected to both the ends of the input capacitor C1. The dot-affixed side of the primary winding N1 of the transformer T is connected to the input terminal 11, and the non-dot-affixed side thereof is connected to the main switch Q1. The main switch element Q1 comprises a semiconductor switch element such as MOS-FET. The non-dot-affixed side terminal of the secondary winding N2 of the transformer T is connected to the output terminal 13, and the dot-affixed side terminal thereof is connected to the synchronous rectifying element Q2 such as MOS-FET in series, and connected to the output terminal 14 at the reference potential side. Furthermore, a smoothing output capacitor C2 is equipped between the output terminals 13 and 14.

A constant voltage source 16 corresponding to a different power source equipped at the secondary side of the power source circuit is provided between the drain and source of the synchronous rectifying element Q2. The constant voltage source 16 has a capacitor C5 which has one end connected to the drain of the synchronous rectifying element Q2 of MOS-FET and the other end connected to one end of a resistor R6. The other end of the resistor R6 is connected to the cathode of the zener diode ZD1, and the anode of the zener diode ZD1 is connected to the reference potential. Furthermore, the other end of the resistor R6 is connected to the anode of the diode D3, and the cathode of the diode D3 is connected to the reference potential through a capacitor C6. The point between the cathode of the diode D3 and the capacitor C6 corresponds to the output of the constant voltage source 16.

Furthermore, the auxiliary winding N3 as the driving means of the synchronous rectifying element Q2 is equipped at the secondary side of the transformer T, the dot-affixed side terminal of the auxiliary winding N3 is connected to the reference potential, and the non-dot-affixed side terminal thereof is connected to the gate of the synchronous rectifying element Q2 through a speed-up capacitor C4. The non-dot-affixed side terminal of the auxiliary winding N3 is connected to the cathode of the diode D6, and the anode of the diode D6 is connected through the series circuit of a resistor R7 and a timing capacitor C3 to the reference potential. The point between the resistor R7 and the timing capacitor C3 is connected to the point between the cathode of the diode D3 and the capacitor C6 of the constant voltage source 16 through a resistor R2. Furthermore, the point between the resistor R7 and the capacitor C3 is connected to the base of the transistor Tr1. The collector of the transistor Tr1 is connected to the gate of the synchronous rectifying element Q2, and the emitter thereof is connected to the reference potential. The cathode of the diode D1 is connected to the gate of the synchronous rectifying element Q2, and the anode of the diode D1 is connected to the reference potential.

An npn type transistor Tr4 serving as switch element control means is connected between the output terminal 13 and the base of the transistor Tr1. The emitter of the transistor Tr4 is connected to the output terminal 13, and the collector thereof is connected to the base of the transistor Tr1 through a resistor R8. The base of the transistor Tr4 is connected to the cathode of the diode D3 serving as the output of the constant voltage source 16 and a capacitor C6.

In the operation of the switching power supply device, the main switch element Q1 is turned on/off by the control circuit 18 to carry out PWM control. During the on-period of the main switch element Q1, the synchronous rectifying element Q2 is turned off, so that no current flows, and the capacitor C6 of the constant voltage source 16 is charged through the capacitor C5. The capacitor C5 restricts the charging amount of the capacitor C6. The charge voltage of the capacitor C6 is a voltage set by the zener diode ZD1. During the on-period of the main switch element Q1, the capacitor C4 is charged by setting the cathode side of the diode D1 to plus by the auxiliary winding N3.

When the main switch element Q1 is turned off, the voltage at the non-dot-affixed side terminal of the auxiliary winding N3 and the charged voltage of the capacitor C4 are applied to the gate of the synchronous rectifying element Q2 to charge the synchronous rectifying element Q2, so that the synchronous rectifying element Q2 is turned on. At the same time, the energy accumulated in the secondary winding N2 is charged in the output capacitor C2 by the fly-back voltage occurring at the secondary winding N2.

At the same time when the main switch element Q1 is turned off, the charging of the timing capacitor C3 is started through the resistor R2 by the constant voltage source 16. Accordingly, the potential of the timing capacitor C3 is gradually increased, and when it reaches the potential at which the transistor TR1 is turned on, the transistor TR1 is turned on and the charges of the gate of the synchronous rectifying element Q2 are discharged, thereby turning off the synchronous rectifying element Q2. The timing at which the transistor TR1 is turned on is set to a timing just before the main switch element Q1 is turned on. When the main switch element Q1 is turned on, the charging of the capacitor C6 of the constant voltage source 16 is started again, and the timing capacitor C3 is discharged through the resistor R7 and the diode D6.

Here, the potential of the capacitor C6 of the constant voltage source 16 is applied to the base of the transistor Tr4, the output voltage of the constant voltage source 16 and the output voltage of the output terminal 13 are compared with each other, the main switch element Q1 is stopped and the voltage of the capacitor C6 of the constant voltage source 16 is reduced. When the transistor Tr4 is reduced to a predetermined potential or less at which the transistor Tr4 is turned on, the pnp type transistor Tr4 is turned on, the timing capacitor C3 is charged through the resistor R8 and thus the transistor Tr1 is turned on. Accordingly, the gate charges of the synchronous rectifying element Q2 are discharged, and the synchronous rectifying element Q2 is turned off. During the period when the transistor Tr4 is turned on, that is, during the period when the potential of the capacitor C6 of the constant voltage source 16 is not more than a predetermined potential because of stop of the main switch element Q1 or the like, the transistor tr1 is turned on, and the synchronous rectifying element Q2 is turned off. When the main switch element Q1 starts its switching during the above period, the synchronous rectifying element Q2 carries out rectification by the body diode thereof. Furthermore, the charging to the constant voltage source 16 is carried out through the transistor Tr4, and the constant voltage source 16 is quickly charged.

According to the switching power supply deice of this embodiment, even when the main switch element Q1 is stopped due to sudden variation of the load and then the switching is re-started, the synchronous rectifying element Q2 is surely turned off, the output voltage of the constant voltage source 16 is equal to a predetermined value or more, and the synchronous rectifying element Q2 is prevented from being turned on until the synchronous rectifying element Q2 is allowed to be normally and surely driven by the timing capacitor C3 and the transistor Tr1. Accordingly, no through current flows into the power supply circuit, and the loss, etc. of the circuit elements can be surely prevented.

Even when a voltage higher than a set voltage is applied between the output terminals 13 and 14 by an external device, the main switch element Q1 is stopped, and the output voltage of the constant voltage is reduced. In this case, the transistor Tr4 is likewise turned on due to reduction of the potential of the constant voltage source 16, and the synchronous rectifying element Q2 is set to the off-state by the transistor Tr1 to prevent self-excitation oscillation.

Furthermore, even when the main switch element Q1 stops its operation by a remote controller or interrupting the input voltage while a large-capacity capacitor as an external device is connected between the output terminals 13 and 14, the voltage of the constant voltage source 16 at the secondary side is reduced, and the synchronous rectifying transistor Q2 is turned off, thereby preventing the self-excitation oscillation due to the energy accumulated in the external large-capacity capacitor between the output terminals 13 and 14. Furthermore, the energy accumulated in the large-capacitance capacitor is consumed in the resistor R4, and the output voltage is quickly reduced.

Figure 8:
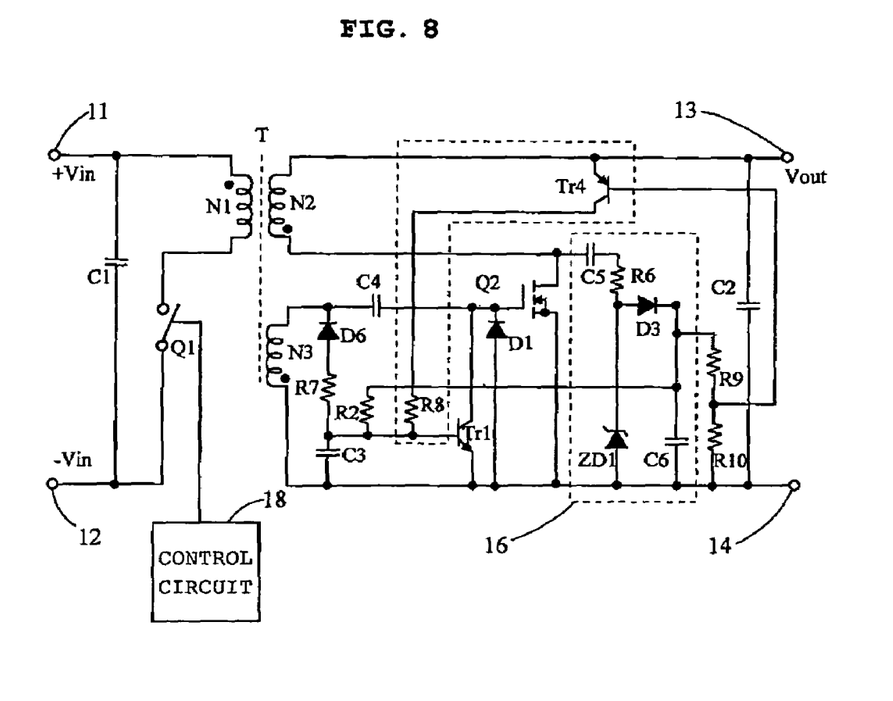
FIG. 8 is a schematic circuit diagram showing another example of the synchronous rectifying switching power supply device of the fifth embodiment according to the invention.

The fly-back type synchronous rectifying switching power supply device of this invention is not limited to the above embodiment. For example, as shown in FIG. 8, the output potential of the constant voltage source 16 of the circuit shown in FIG. 7 may be divided by the resistors R9, R10 to input the divided voltage to the base of the transistor Tr4, whereby the turn-on potential of the transistor Tr4 can be set to any value by properly setting the resistors R9, R10. Furthermore, this circuit may be properly combined with other circuits.

Furthermore, in the fly-back type synchronous rectifying switching power supply device of this embodiment, the charging of a different power source may be carried out by an auxiliary winding, and the circuit may be properly combined with other circuits.

The invention claimed is:

1. A fly-back type synchronous rectifying switching power supply device comprising a primary winding of a transformer and a main switch element connected to each other in series between input terminals and which has a control circuit for subjecting the main switch element to PWM control within a fixed period, a synchronous rectifying element connected to a secondary winding of the transformer in series between output terminals, and driving means for turning on the synchronous rectifying element complementarily with the switching element, a different power supply source charged by a pulse voltage occurring at the secondary winding of the transformer through a switching operation of the main switch element, and interrupting means disposed between the gate and source of the synchronous rectifying element and which turns off the synchronous rectifying element, wherein an off-timing at which the interrupting means turns off the synchronous rectifying element is set to a timing which corresponds to a fixed time set by current from the different power source after the switch element is turned on and is within a range which is as near as a fixed driving period of the switch element.

2. The synchronous rectifying switching power supply device according to claim 1, wherein the interrupting means comprises a transistor and a timing capacitor connected to a signal input terminal of the transistor, the timing capacitor is charged by the different power source and discharged at the instantaneous time when the main transistor is turned on, the timing capacitor is started to be charged from the instantaneous time concerned, and a period from this time to a time in which the voltage of the timing capacitor exceeds a threshold value of the signal input terminal of the transistor is set to a time within the fixed driving period of the switch element.

3. The synchronous rectifying switching power supply device according to claim 2, wherein the different power source is a constant voltage source or constant current source connected to the secondary winding of the transformer.

4. The synchronous rectifying switching power supply device according to claim 3, wherein a snubber circuit for absorbing surge energy when the synchronous rectifying element is turned off is provided to the different power source for charging the timing capacitor so that the timing capacitor is charged with the energy absorbed by the snubber circuit.

5. A fly-back type synchronous rectifying switching power supply device comprising a primary winding of a transformer and a main switch element connected to each other in series between input terminals and which has a control circuit for subjecting the main switch element to PWM control within a fixed period, a synchronous rectifying element connected to a secondary winding of the transformer in series between output terminals, and driving means for turning on the synchronous rectifying element complementarily with the switching element, a different power supply source charged by a pulse voltage occurring at the secondary winding of the transformer through a switching operation of the main switch element, interrupting means disposed between the gate and source of the synchronous rectifying element and which turns off the synchronous rectifying element, and a control element for comparing the output voltage of the different power source with the output voltage of the output terminal of the switching power supply device, and controlling the interrupting means to turn off the synchronous rectifying element when the output voltage of the different power source is reduced to a fixed value or less.

6. The synchronous rectifying switching power supply device according to claim 5, wherein a transistor of the interrupting means is an npn transistor for turning off the synchronous rectifying element, and the control element comprises a pnp transistor whose emitter and collector are connected to the output terminal and the base of the npn transistor respectively, and the output of the different power source is connected to the base of the pnp transistor.

7. The synchronous rectifying switching power supply device according to claim 6, wherein the different power source is a constant voltage source connected to the secondary winding of the transformer, and an output voltage of the different power source is divided to input the divided voltage to the base of the pnp transistor.

8. The synchronous rectifying switching power supply device according to claim 7, wherein a snubber circuit for absorbing surge energy when the synchronous rectifying element is turned off is provided to the different power source for charging the timing capacitor, and the timing capacitor is charged with the energy absorbed by the snubber circuit.

* * * * *